United States Patent
Saji et al.

(10) Patent No.: US 8,984,975 B2
(45) Date of Patent: Mar. 24, 2015

(54) ENGAGEMENT CHAIN UNIT

(75) Inventors: Tomoyuki Saji, Osaka (JP); Keisuke Murakami, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 14/116,620

(22) PCT Filed: May 1, 2012

(86) PCT No.: PCT/JP2012/061567
§ 371 (c)(1),
(2), (4) Date: Nov. 8, 2013

(87) PCT Pub. No.: WO2012/153680
PCT Pub. Date: Nov. 15, 2012

(65) Prior Publication Data
US 2014/0076082 A1 Mar. 20, 2014

(30) Foreign Application Priority Data
May 12, 2011 (JP) ................................. 2011-107548

(51) Int. Cl.
F16H 27/02 (2006.01)
F16H 29/20 (2006.01)
F16H 29/02 (2006.01)
F16H 19/06 (2006.01)
F16G 13/20 (2006.01)
B66F 3/06 (2006.01)

(52) U.S. Cl.
CPC ............ *F16H 19/0636* (2013.01); *F16G 13/20* (2013.01); *B66F 3/06* (2013.01)
USPC ......................................................... 74/89.2

(58) Field of Classification Search
CPC ....... F16G 13/20; F16G 9/00; F16H 19/0636; B66F 13/005; B66F 3/06
USPC ..................... 74/89.2, 89.21, 89.22
See application file for complete search history.

(56) References Cited

U.S. PATENT DOCUMENTS 2,375,461 A * 5/1945 Bender ........................... 52/108
3,645,146 A 2/1972 Nagin
(Continued)

FOREIGN PATENT DOCUMENTS

CA 2070284 4/1992
EP 0799788 10/1997
(Continued)

OTHER PUBLICATIONS

International Search Report prepared by the Japanese Patent Office on Jul. 17, 2012, for International Application No. PCT/JP2012/061567.
(Continued)

*Primary Examiner* — Justin Krause
(74) *Attorney, Agent, or Firm* — Sheridan Ross P.C.

(57) ABSTRACT

Provided is an interlocking chain unit that has reliable and strong interlocking and avoids buckling, breaking, and bending of a rigidified chain portion. In the interlocking chain unit (100), the interlocking operation of an outer tooth link plate (112BZ) and an outer tooth link plate (112AY) that are just about to complete the interlocking operation is completed in a manner that causes a first inter-pin distance (d1) and a second inter-pin distance (d2) become substantially equal to each other, and causes a third inter-pin distance (d3) to approach the second inter-pin distance (d2).

6 Claims, 13 Drawing Sheets

(56) References Cited

U.S. PATENT DOCUMENTS

| | | | |
|---|---|---|---|
| 5,355,643 A | 10/1994 | Bringolf | |
| 7,921,986 B2 | 4/2011 | Ando et al. | |
| 8,069,954 B2* | 12/2011 | Kempf | 187/250 |
| 8,500,101 B2* | 8/2013 | Yaoi et al. | 254/372 |
| 2004/0157691 A1* | 8/2004 | Olmsted | 474/152 |
| 2006/0219144 A1 | 10/2006 | Phelan et al. | |
| 2008/0315168 A1* | 12/2008 | Takeuchi et al. | 254/358 |
| 2009/0118048 A1* | 5/2009 | Takashima et al. | 474/215 |
| 2009/0166155 A1 | 7/2009 | Hishioka et al. | |
| 2010/0051424 A1 | 3/2010 | Suko et al. | |
| 2010/0059727 A1 | 3/2010 | Suko et al. | |
| 2010/0140572 A1 | 6/2010 | Aoki | |
| 2013/0276422 A1 | 10/2013 | Saji | |
| 2013/0283945 A1 | 10/2013 | Kaisaku et al. | |
| 2013/0298705 A1 | 11/2013 | Saji et al. | |
| 2013/0312554 A1 | 11/2013 | Saji et al. | |

FOREIGN PATENT DOCUMENTS

| | | |
|---|---|---|
| JP | 51-131060 A | 11/1976 |
| JP | S64-058883 | 3/1989 |
| JP | H03-012646 | 1/1991 |
| JP | H05-3300 | 1/1993 |
| JP | 6-13399 Y2 | 4/1994 |
| JP | H09-119495 | 5/1997 |
| JP | H11-278797 | 10/1999 |
| JP | 3384491 | 12/2002 |
| JP | 2007-269414 A | 10/2007 |
| JP | 2008-256202 | 10/2008 |
| JP | 2009-001398 | 1/2009 |
| JP | 2009-113872 A | 5/2009 |
| JP | 2009-242010 | 10/2009 |
| JP | 2009-255997 | 11/2009 |
| JP | 2010-47384 A | 3/2010 |
| JP | 2010-65721 A | 3/2010 |
| JP | 2010-138926 | 6/2010 |
| WO | WO 92/07154 | 4/1992 |

OTHER PUBLICATIONS

International Search Report prepared by the Japanese Patent Office on Jan. 17, 2012, for International Application No. PCT/JP2011/078679.

International Search Report prepared by the Japanese Patent Office on Mar. 13, 2012, for International Application No. PCT/JP2011/078755.

International Search Report prepared by the Japanese Patent Office on Apr. 17, 2012, for International Application No. PCT/JP2011/080166.

International Search Report prepared by the Japanese Patent Office on Apr. 17, 2012, for International Application No. PCT/JP2011/080160.

International Search Report prepared by the Japanese Patent Office on Jun. 12, 2012, for International Application No. PCT/JP2012/056703.

Search Report for European Patent Application No. 12781603.1, dated Nov. 18, 2014, 5 pages.

* cited by examiner

ENGAGEMENT CHAIN UNIT

CROSS-REFERENCE TO RELATED APPLICATIONS

This application is a national stage application under 35 U.S.C. 371 and claims the benefit of PCT Application No. PCT/JP2012/061567 filed 1 May 2012, which designated the United States, which PCT Application claimed the benefit of Japanese Patent Application No. 2011-107548 filed 12 May 2011, the disclosure of each of which are incorporated herein by reference.

FIELD OF THE INVENTION

The present invention relates to an interlocking chain unit used in manufacturing facilities in various manufacturing fields, transportation facilities in the transportation field, nursing care facilities in medical and welfare fields, and stage facilities in art fields, and moving a driven body forward and backward.

BACKGROUND OF THE INVENTION

Conventionally, as a drive unit, a drive unit is known that moves a driven object such as a heavy object by using a pair of interlocking chains, which are also referred to as zip chains. Specifically, the pair of interlocking chains are interlocked with each other and integrally driven (for example, refer to Patent Document 1).

Also, a silent chain transmission device has known in which noise and vibrations caused in driving of chains are suppressed by defining shapes of faces of link plates to be interlocked with inner flanks, i.e., sprocket teeth (for example, refer to Patent Document 2).

PRIOR ART DOCUMENTS

Patent Documents

Patent Document 1: Japanese Laid-Open Patent Publication No. 2009-113872 (refer to Claims and FIG. 5)
Patent Document 2: Japanese Laid-Open Utility Model Publication No. 6-13399 (refer to Claim and FIG. 1)

SUMMARY OF THE INVENTION

However, the above-described prior art related to the interlocking chains does not mention specific design matters such as interlocking end faces for engaging inner tooth plates and outer tooth plates with each other and buckling restricting end faces for restricting buckling. Therefore, it is difficult to firmly and reliably engage the inner tooth plates with the outer tooth plates.

Moreover, in the above-described interlocking chains, uneven compression forces are applied to the inner tooth plates and the outer tooth plates when these plates are interlocked with each other and therefore it is difficult to avoid buckling, breaking, and bending caused in a rigidified chain portion of the pair of interlocking chains, which are interlocked and integrated with each other In other words, unavoidable clearance backlash between parts remains in the chains after the interlocking. Therefore, it is difficult to avoid the buckling, breaking, and bending caused in the rigidified chain portion by suppressing application of the uneven compression forces in the interlocking.

Therefore, a technical problem to be solved by the invention, i.e., an object of the invention is to provide an interlocking chain unit that allows inner tooth plates and outer tooth plates to be reliably and firmly interlocked with each other and avoids buckling, breaking, and bending of the rigidified chain portion.

To solve the above described problems, embodiments of the present invention provide an interlocking chain unit comprising a pair of interlocking chains.

The pair of interlocking chains includes a first interlocking chain and a second interlocking chain, each of which includes outer tooth link plates each having a hook-shaped interlocking end face and a buckling restricting end face, pairs of front and rear coupling pins fitted to the outer tooth link plates, and inner tooth link plates alternately placed with the outer tooth link plates in a state of being loosely fitted to the coupling pins. The first interlocking chain and the second interlocking chain are interlocked with each other to form a rigidified chain portion, and are disengaged from each other to bifurcate. A link plate that is one of the inner tooth link plates and the outer link plates of the first interlocking chain and is in a state immediately before completion of an interlocking operation is defined as a first link plate. A link plate of the second interlocking chain that is located subsequent to the first link plate is defined as a second link plate. The second link plate has a disengagement-side coupling pin. A link plate that is located subsequent to the second link plate is defined as a third link plate. The third link plate has a disengagement-side coupling pin and a coupling pin that faces the disengagement-side coupling pin of the second link plate. The interlocking operation between the first link plate and the second link plate is completed such that: a first inter-pin distance between the disengagement-side coupling pin of the second link plate and the coupling pin facing the disengagement-side coupling pin of the second link plate is made substantially equal to a second inter-pin distance in the rigidified chain portion; and a third inter-pin distance between the disengagement-side coupling pin of the third link plate and a coupling pin that faces the disengagement-side coupling pin of the third link plate is made to approach the second inter-pin distance in the rigidified chain portion.

To solve the above described problems, embodiments of the present invention provide an interlocking chain unit in which when the first inter-pin distance and the third inter-pin distance become equal to the second inter-pin distance in the rigidified chain portion in the process of reaching the position of the first link plate from the position of the third link plate at the time of the interlocking operation, any or all of the inner tooth link plates, the outer tooth link plates, and the coupling pins are elastically deformed.

To solve the above described problems, embodiments of the present invention provide an interlocking chain unit in which, in the interlocking operation, the buckling restricting end face of the third link plate contacts the buckling restricting end face of the second link plates. In the interlocking operation, the second link plate behaves to match the plate axis of the third link plate with the forward and backward direction of the rigidified chain.

To solve the above described problems, embodiments of the present invention provide an interlocking chain unit in which a link plate that is located subsequent to the third link plate is defined as a fourth link plate. In the interlocking operation, the hook-shaped interlocking end face of the third link plate is interlocked with the hook-shaped interlocking end face of the fourth link plate. In the interlocking operation, the fourth link plate behaves to match the plate axis of the third link plate with the forward and backward direction of the rigidified chain.

To solve the above described problems, embodiments of the present invention provide an interlocking chain unit in which the second inter-pin distance is defined by the hook-shaped interlocking end faces existing between a pair of coupling pins that face each other in the chain width direction and are interlocked with each other in a state of being included in the rigidified chain portion, and by the buckling restricting end faces contacting each other.

To solve the above described problems, embodiments of the present invention provide an interlocking chain unit in which the pair of interlocking chains are interlocked with each other by a chain movement restricting means that regulates the operation of the pair of the interlocking chains from the chain disengagement direction to a deflection region that extends in the forward and backward direction of the rigidified chain.

To solve the above described problems, embodiments of the present invention provide an interlocking chain unit in which the chain movement restricting means is a drive sprocket provided in an interlocking chain type forward and backward actuating device configured to move a driven body forward and backward according to chain forward and backward movements based on interlocking and disengagement of the pair of interlocking chains.

The interlocking chain unit according embodiments of the invention is constituted by a pair of interlocking chains including a first interlocking chain and a second interlocking chain. The first and second interlocking chains each include outer tooth link plates, pairs of front and rear coupling pins, and inner tooth link plates. Each outer tooth link plate has a hook-shaped interlocking end face and a buckling restricting end face. Each pair of front and rear coupling pins are fitted to the outer tooth link plate. The inner tooth link plates are alternately placed with the outer tooth link plates in a state of being loosely fitted to the coupling pins, respectively. The first interlocking chain and the second interlocking chain are interlocked with each other to form a rigidified chain portion, and are disengaged from each other to bifurcate, thereby making it possible to switch a rigidified state of the chain and a bifurcated state of the chain according to the advancing and retreating operation of the pair of interlocking chains, and making it possible to achieve particular advantages corresponding to the following unique structures.

That is, in the interlocking chain unit according various embodiments, a link plate that is one of the inner tooth link plates and the outer link plates of the first interlocking chain and is in a state immediately before completion of an interlocking operation is defined as a first link plate. A link plate of the second interlocking chain that is located subsequent to the first link plate is defined as a second link plate, the second link plate having a disengagement-side coupling pin.

A link plate that is located subsequent to the second link plate is defined as a third link plate, the third link plate having a disengagement-side coupling pin and a coupling pin that faces the disengagement-side coupling pin of the second link plate. The interlocking operation between the first link plate and the second link plate is completed such that: a first inter-pin distance between the disengagement-side coupling pin of the second link plate and the coupling pin facing the disengagement-side coupling pin of the second link plate is made substantially equal to a second inter-pin distance in the rigidified chain portion; and a third inter-pin distance between the disengagement-side coupling pin of the third link plate and a coupling pin that faces the disengagement-side coupling pin of the third link plate is made to approach the second inter-pin distance in the rigidified chain portion. Thus, the transition to the smooth interlocking operation of other types of link plates subsequent to the second link plate, that is, the inner tooth link plate in the case where the first, second and third link plates are the outer tooth link plates, or the outer tooth link plate in the case where the first, second and third link plates are the inner tooth link plates is achieved, in the state of fixing each of the positions of the disengagement-side coupling pin of the second link plate and the non-disengagement-side coupling pin forming a pair there with, the plate axis of the second link plate, that is, the axial line connecting the disengagement-side coupling pin and the non-disengagement-side coupling pin of the second link plate is matched in the forward and backward direction of the rigidified chain, and an interlocking portion obtained by interlocking the hook-shaped interlocking end faces of each of the first link plate and the second link plate is held by the buckling restricting end face of the third link plate. Accordingly, it is possible to achieve the rigid and reliable interlocking between the inner tooth link plates and between the outer tooth link plates in the state of avoiding the action of the non-uniform compressive force during interlocking, and it is possible to avoid buckling, breaking and bending of the rigidified chain portion, by improving the rigidity of the pair of interlocking chains that are interlocked and integrated with each other.

In addition, in order that the interlocking between the first link plate and the second link plate between the first pins is completed, the hook-shaped interlocking end face of the first link plate and the hook-shaped interlocking end face of the second link plate need to be fixed by the third link plate subsequent to the second link plate so as not to be disengaged from each other. Accordingly, each of the link plates behaves such that the third inter-pin distance approaches the second inter-pin distance, thus the action of the second link plate being fixed by the third link plate is completed, and the interlocking between the first link plate and the second link plate between the first pins is completed.

Furthermore, the proximity state of the third inter-pin distance is achieved by the interlocking between the hook-shaped interlocking end faces of the inner tooth link plate or the outer tooth link plate.

Moreover, in the interlocking chain unit according to claim 2, in addition to the advantage achieved by the interlocking chain unit according to claim 1, when the first inter-pin distance and the third inter-pin distance become equal to the second inter-pin distance in the rigidified chain portion in the process of reaching the position of the first link plate from the position of the third link plate at the time of the interlocking operation, any or all of the inner tooth link plate, the outer tooth link plate, and the coupling pin are elastically deformed. Thus, the vibration is avoided by smoothly interlocking the hook-shaped interlocking end faces at the time of the interlocking operation, the interlocking chains are sequentially rotated around the preceding coupling pin in the forward and backward directions of the rigidified chain of the pair of front and rear coupling pins of each of the first, second, and third link plates performing the interlocking operation in sequence, and backlash is further reduced in the state of removing the play between the components by rigidifying the pair of interlocking chains along with the above-described elastic deformation. Accordingly, it is possible to reduce the vibration that is one of the obstacles when firmly and securely fixing the inner tooth link plates and the outer tooth link plates. Also, it is possible to effectively firmly and reliably interlock the inner tooth link plates, and the outer tooth link plates by utilizing the elastic force generated by the inner tooth link plate, the outer tooth link plate, and the preceding coupling pin, and it is possible to further avoid buckling, breaking and bending of the rigidified chain portion by improving the rigidity of the pair of interlocking chains that are interlocked and integrated with each other.

Moreover, in the interlocking chain unit according to certain embodiments, the buckling restricting end face of the third link plate contacts the buckling restricting end face of the second link plate at the time of the interlocking operation, and the second link plate behaves so as to match the plate axis of the third link plate in the forward and backward directions of the rigidified chain at the time of the interlocking operation, thereby bringing the buckling restricting end face of the third link plate into contact with the buckling restricting end face of the second link plate along with the interlocking operation between the hook-shaped interlocking end faces of each of the same kind of link plate subsequent to the third link plate, and the third link plate. Accordingly, it is possible to firmly and reliably interlock the inner tooth link plates and the outer tooth link plates. Also, it is possible to further reliably avoid buckling, breaking, and bending of the rigidified chain portion by improving the rigidity of the pair of interlocking chains that are interlocked and integrated with each other.

Moreover, the interlocking chain unit according to certain embodiments has the following advantages in addition to the advantage achieved by the interlocking chain unit shown and described herein. That is, a link plate that is located subsequent to the third link plate is defined as a fourth link plate. In the interlocking operation, the hook-shaped interlocking end face of the third link plate is interlocked with the hook-shaped interlocking end face of the fourth link plate. In the interlocking operation, the fourth link plate behaves to match the plate axis of the third link plate with the forward and backward directions of the rigidified chain. Accordingly, it is possible to avoid buckling, breaking and bending of the rigidified chain portion by reliably interlocking the pair of interlocking chains in a state of guiding the inner tooth link plate and the outer tooth link plate in the forward and backward directions of the rigidified chain.

In more detail, in the interlocking accompanied by the elastic deformation, even if the first link plate and the second link plate are interlocked with each other, the elastic force by which the elastically deformed component would return to the original status causes the interlocked interlocking chains to be disengaged from each other.

At this time, it is difficult to maintain the interlocking accompanied by the elastic deformation only by the third link plate. However, by sequentially interlocking the link plates using a rigidified-side pin as a fulcrum, it is possible to suppress the disengagement of the chains with less power by the principle of leverage. Accordingly, the interlocking accompanied by the elastic deformation in the first and second link plates is completed by completion of the interlocking using the third and fourth link plates.

Moreover, the interlocking chain unit according to certain embodiments has the following advantages in addition to the advantage achieved by the interlocking chain unit according to various embodiments shown and described herein. That is, the second inter-pin distance is defined by the hook-shaped interlocking end faces existing between a pair of coupling pins that face each other in the chain width direction and are interlocked with each other in a state of being included in the rigidified chain portion, and by the buckling restricting end faces contacting each other. This forms the rigidified chain portion in a state of balancing the force acting on the hook-shaped interlocking end faces interlocked with each other and the force acting on the buckling restricting end faces contacting each other. Accordingly, it is possible to reliably avoid buckling, breaking, and bending of the rigidified chain portion, by further improving the rigidity of the rigidified chain portion in the state of defining the width of the rigidified chain portion.

In addition, the third inter-pin distance acts in the direction of spreading between the coupling pins by the contact of the buckling restricting end face interposed between the disengagement-side coupling pin of the third link plate and the coupling pin facing the disengagement-side coupling pin of the third link plate.

Furthermore, the inter-pin distance acts so as not to be spread by the contact of the hook-shaped interlocking end faces interposed between the disengagement-side coupling pin of the third link plate and the coupling pin facing the disengagement-side coupling pin of the third link plate so as to be interlocked with each other.

By the engagement of the interlocking chains so as to define the inter-pin distance in the direction in which the buckling restricting end faces and the hook-shaped interlocking end faces are opposite to each other in the width direction connected by the coupling pins, it is possible to define the inter-pin distance at the time of the interlocking of the interlocking chains, and achieve the rigidity.

In the case of the interlocking accompanied by the elastic deformation, since the inter-pin distance defined by the buckling restricting end faces is greater than the inter-pin distance defined by the hook-shaped interlocking portions, it is possible to reliably restrict the inter-pin distance, and the rigidity of the chain is remarkably improved.

The advantage of improving the rigidity at the time of the interlocking between the first interlocking chain and the second interlocking chain without any problem is significantly obtained when a compressive load is applied in the forward and backward directions of the rigidified chain.

Furthermore, even when the coupling pins facing each other at the time of the interlocking operation between the first interlocking chain and the second interlocking chain is slightly shifted in the forward and backward directions of the rigidified chain, there is no problem in the interlocking operation of the interlocking chains.

Moreover, the interlocking chain unit according certain embodiments has the following advantages in addition to the advantage achieved by the interlocking chain unit as shown and described herein. That is, the pair of interlocking chains are interlocked with each other by a chain movement restricting means that regulates the operation of the pair of the interlocking chains from the chain disengagement direction to a deflection region that extends in the forward and backward directions of the rigidified chain. This allows a driven body to be driven forward and backward by the rigidified chain portion with improved rigidity. Accordingly, it is possible to accurately move the driven body forward and backward to a predetermined position, by avoiding buckling, breaking, and bending of the rigidified chain portion.

In addition, since the subsequent disengagement-side link plate holds the preceding rigidified-side plate by guiding from the disengagement direction of the interlocking chain to the interlocking position, the rigidified chain portion is capable of advancing and retreating, while maintaining the rigid state without separating the interlocked chains.

In the interlocking chain unit according various embodiments of the present invention the chain movement restricting means is a drive sprocket provided in an interlocking chain type forward and backward actuating device configured to move a driven body forward and backward according to the chain forward and backward movements based on the interlocking and the disengagement of the pair of interlocking chains. Since the driven body is driven to move forward and backward by the rigidified chain portion having the increased rigidity, it is possible to achieve accurate forward and backward movements of the driven body to predetermined positions while avoiding buckling, breaking, and bending of the rigidified chain portion.

DETAILED DESCRIPTION OF THE PREFERRED EMBODIMENTS

Figure 1:
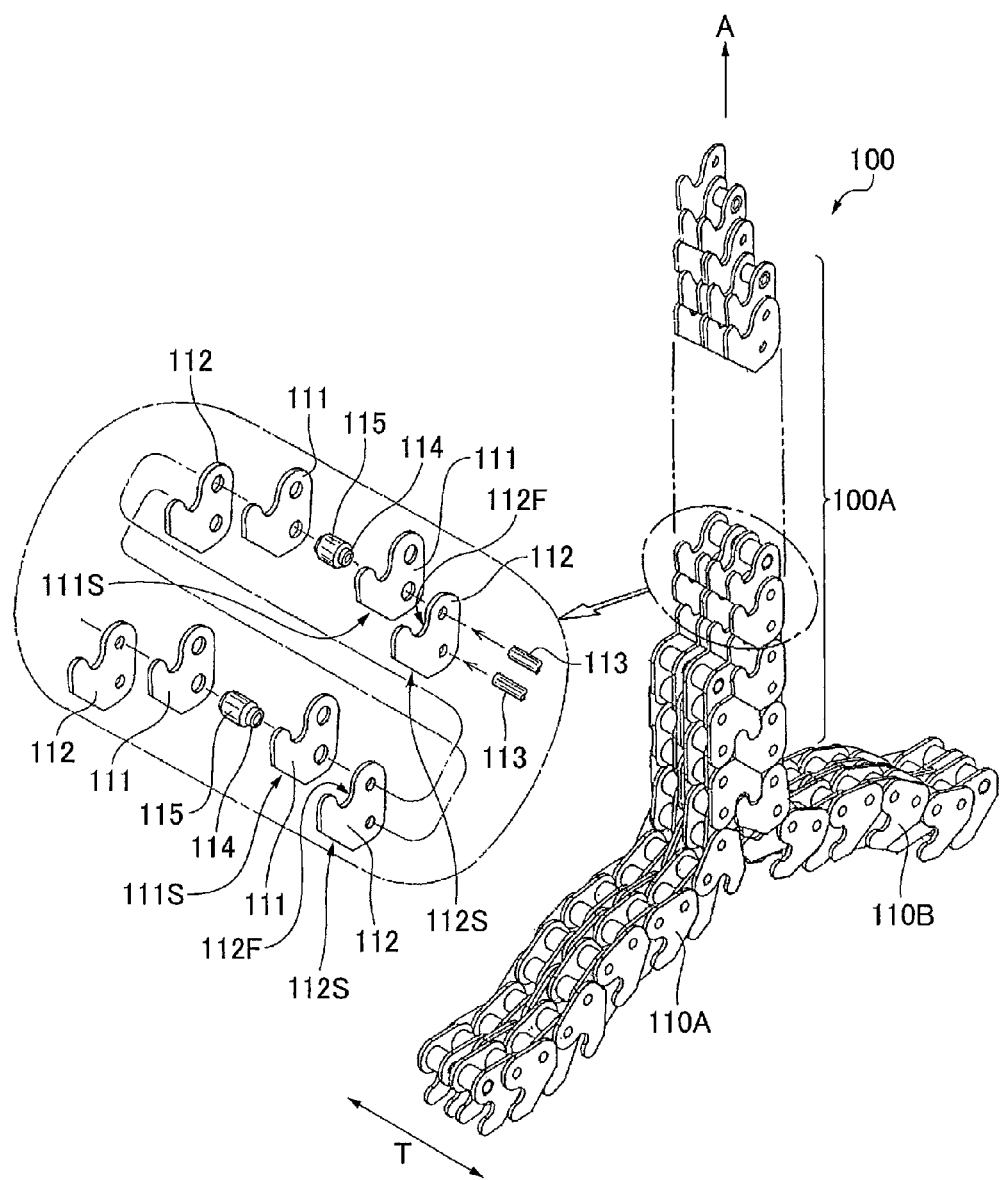
FIG. 1 is a perspective view of an exploded state of an interlocking chain unit according to one embodiment of the present invention.

An interlocking chain unit of the invention may be embodied in any specific form as long as the following configuration is realized. That is, an interlocking chain unit includes a pair of interlocking chains. The pair of interlocking chains includes a first interlocking chain and a second interlocking chain, each of which includes outer tooth link plates each having a hook-shaped interlocking end face and a buckling restricting end face, pairs of front and rear coupling pins fitted to the outer tooth link plates, and inner tooth link plates alternately placed with the outer tooth link plates in a state of being loosely fitted to the coupling pins. The first interlocking chain and the second interlocking chain are interlocked with each other to form a rigidified chain portion, and are disengaged from each other to bifurcate. A link plate that is one of the inner tooth link plates and the outer link plates of the first interlocking chain and is in a state immediately before completion of an interlocking operation is defined as a first link plate. A link plate of the second interlocking chain that is located subsequent to the first link plate is defined as a second link plate, the second link plate having a disengagement-side coupling pin. A link plate that is located subsequent to the second link plate is defined as a third link plate, the third link plate having a disengagement-side coupling pin and a coupling pin that faces the disengagement-side coupling pin of the second link plate. The interlocking operation between the first link plate and the second link plate is completed such that: a first inter-pin distance between the disengagement-side coupling pin of the second link plate and the coupling pin facing the disengagement-side coupling pin of the second link plate is made substantially equal to a second inter-pin distance in the rigidified chain portion; and a third inter-pin distance between the disengagement-side coupling pin of the third link plate and a coupling pin that faces the disengagement-side coupling pin of the third link plate is made to approach the second inter-pin distance in the rigidified chain portion.

The interlocking chain unit may be constituted by a plurality of rows of chain units in which a large number of link units are respectively coupled in the chain longitudinal direction. The link unit includes inner tooth link plates and outer tooth link plates located outside of the inner tooth link plates. An inner tooth link plate and an outer tooth link plate constitute one set of the link unit facing in the chain thickness direction. The interlocking chain unit may also be constituted by a chain unit of a single row.

Furthermore, the interlocking chain unit of the invention includes only the coupling pins and the link plates. The interlocking chain unit may also include silent type interlocking chains.

Furthermore, the advantages achieved by the outer tooth link plates and the inner tooth link plates described above are also similarly achieved even in a case the relationship between the outer tooth link plates and the inner tooth link plates is reversed.

In addition, even when recessed notches are provided at parts of the hook-shaped interlocking end faces of the interlocking chain on one side of the pair of interlocking chains or the buckling restricting end faces, or even when the buckling restricting end faces are curved surfaces, the same advantages as the above-described advantage are achieved.

The interlocking chain type forward and backward actuating device including the interlocking chain units according to the invention does not cause any problem in forward and backward operations even if an installation face is a floor face where the interlocking chain type forward and backward actuating device stands or a ceiling face where the interlocking chain type forward and backward actuating device is suspended. Further, even if the installation face is a vertical wall face where the interlocking chain type forward and backward actuating device is cantilevered, the device has no trouble in the above-described forward and backward movements.

Furthermore, an interlocking chain type forward and backward actuating device including the interlocking chain unit according to the invention may be installed on a wall surface, and may advance and retreat in parallel with the wall surface.

Embodiments

Hereinafter, an interlocking chain unit 100 according to an embodiment of the invention will be described with reference to FIGS. 1 to 13.

Figure 2:
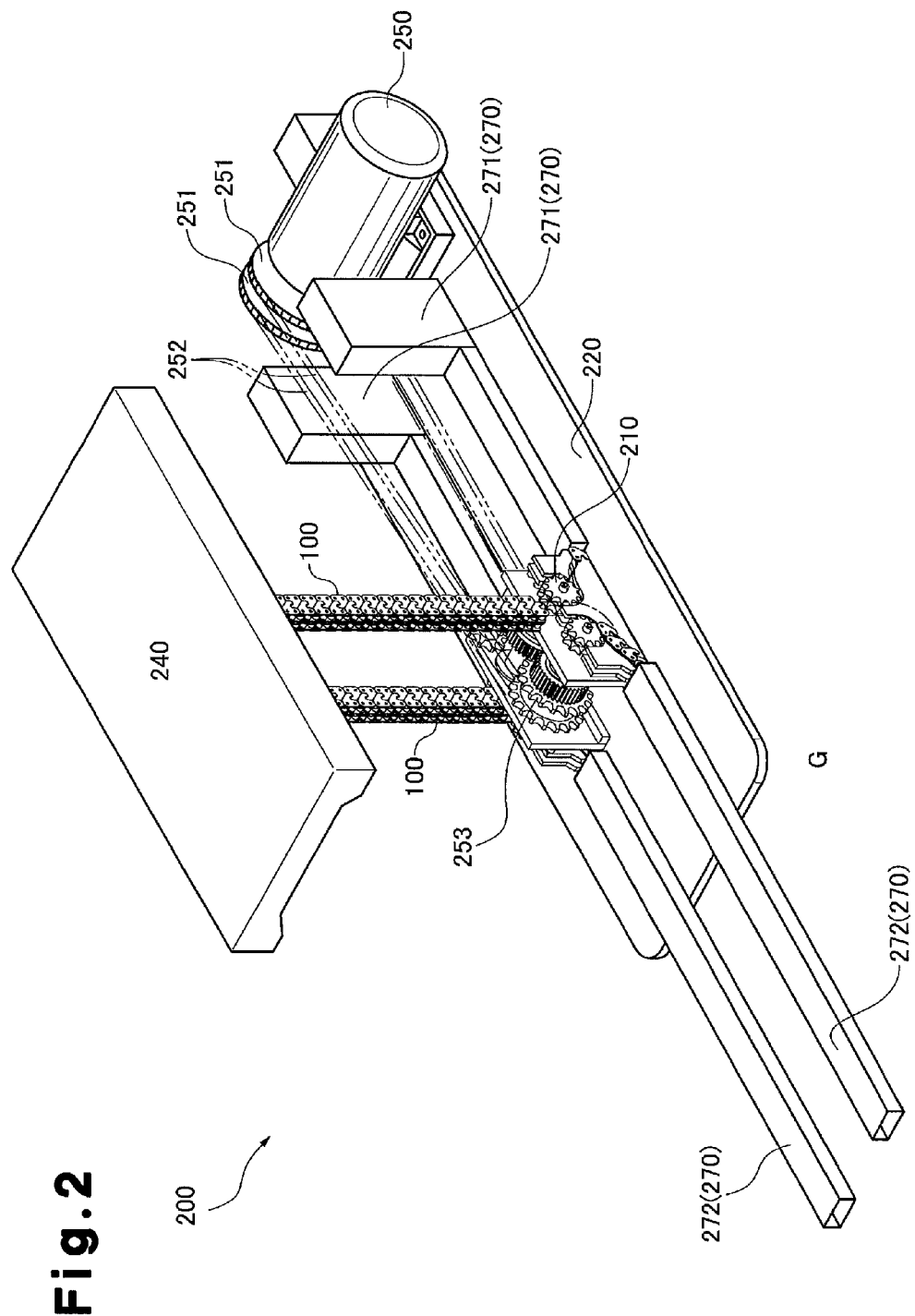
FIG. 2 is a perspective view of an interlocking chain type forward and backward actuating device including the interlocking chain units according to the invention.
Figure 3:
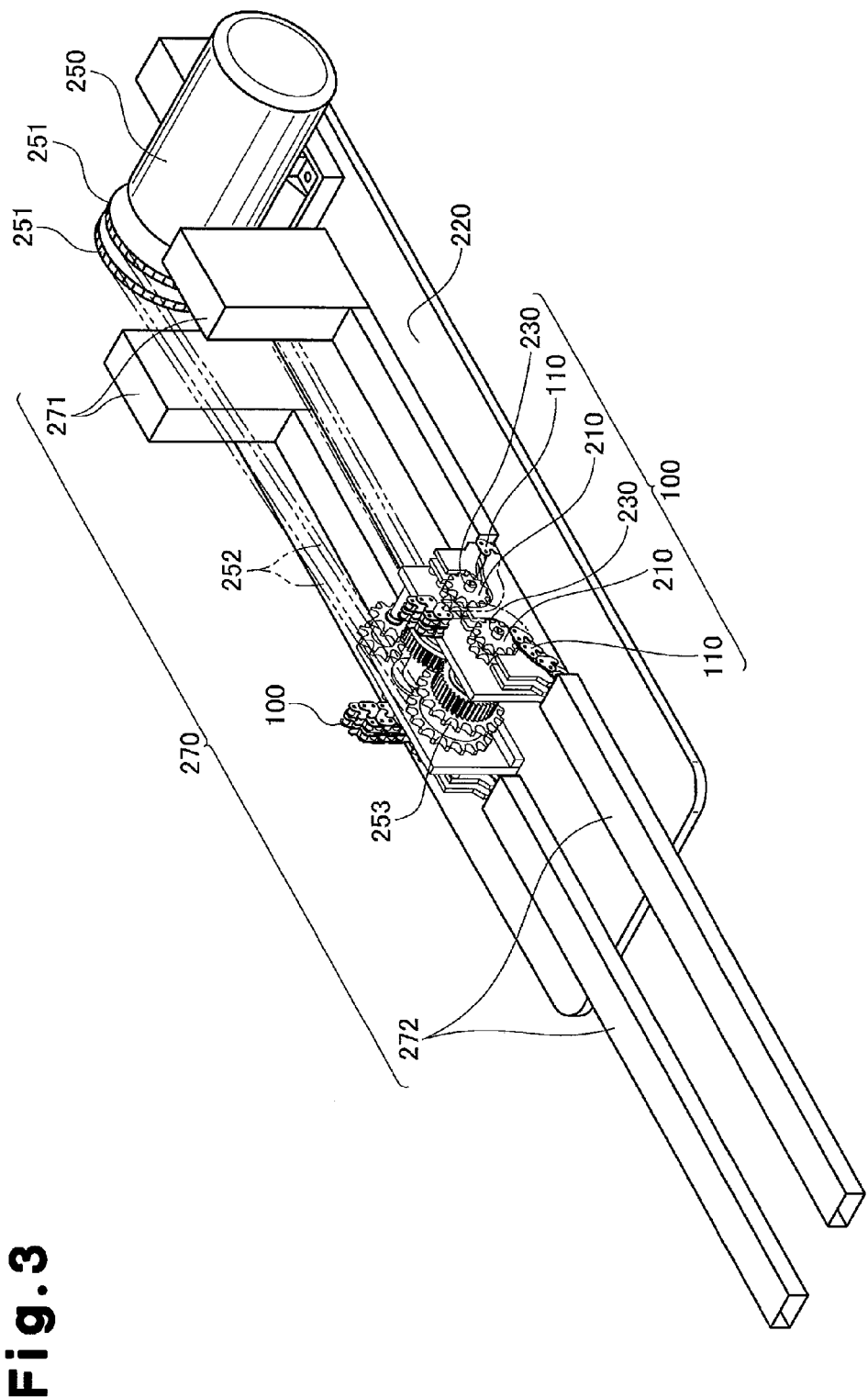
FIG. 3 is a perspective view of FIG. 2 from which a lifting table is removed.
Figure 4:
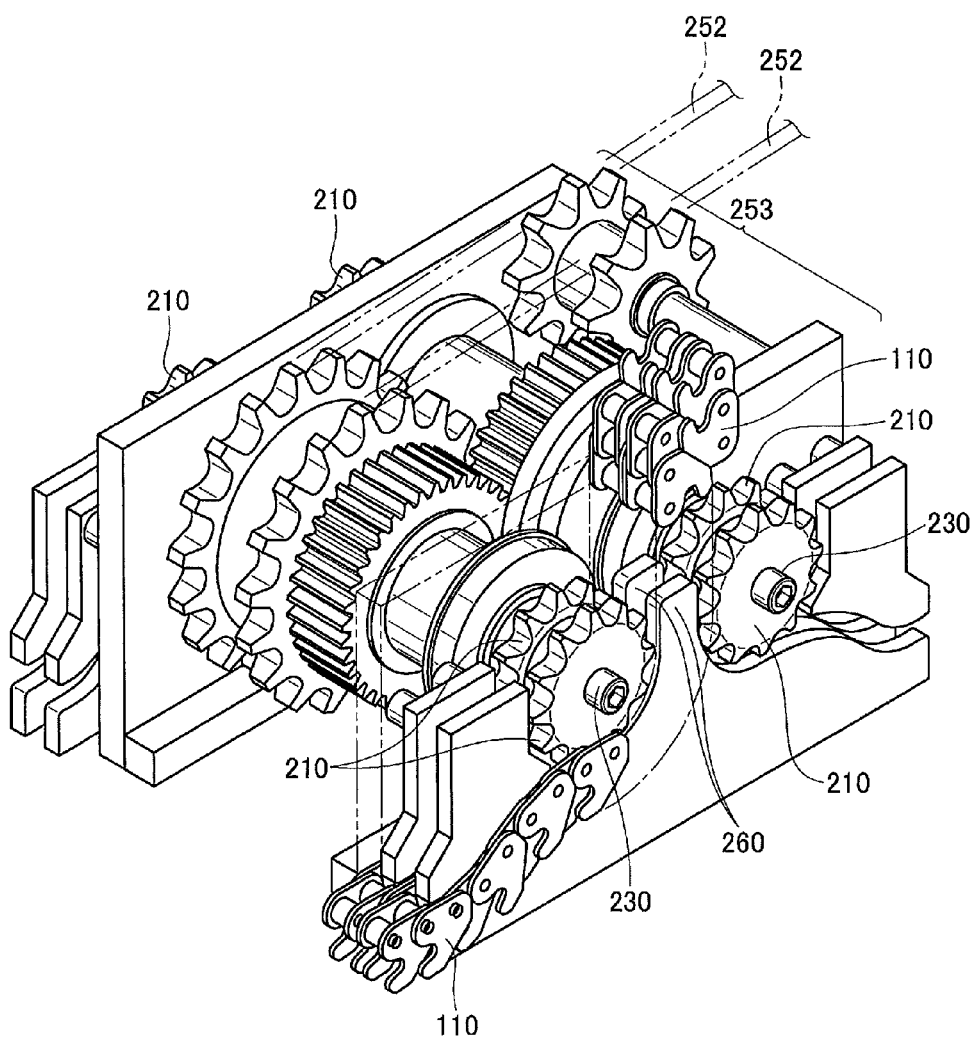
FIG. 4 is a partially enlarged view of a vicinity of a drive sprocket shown in FIG. 3.
Figure 5:
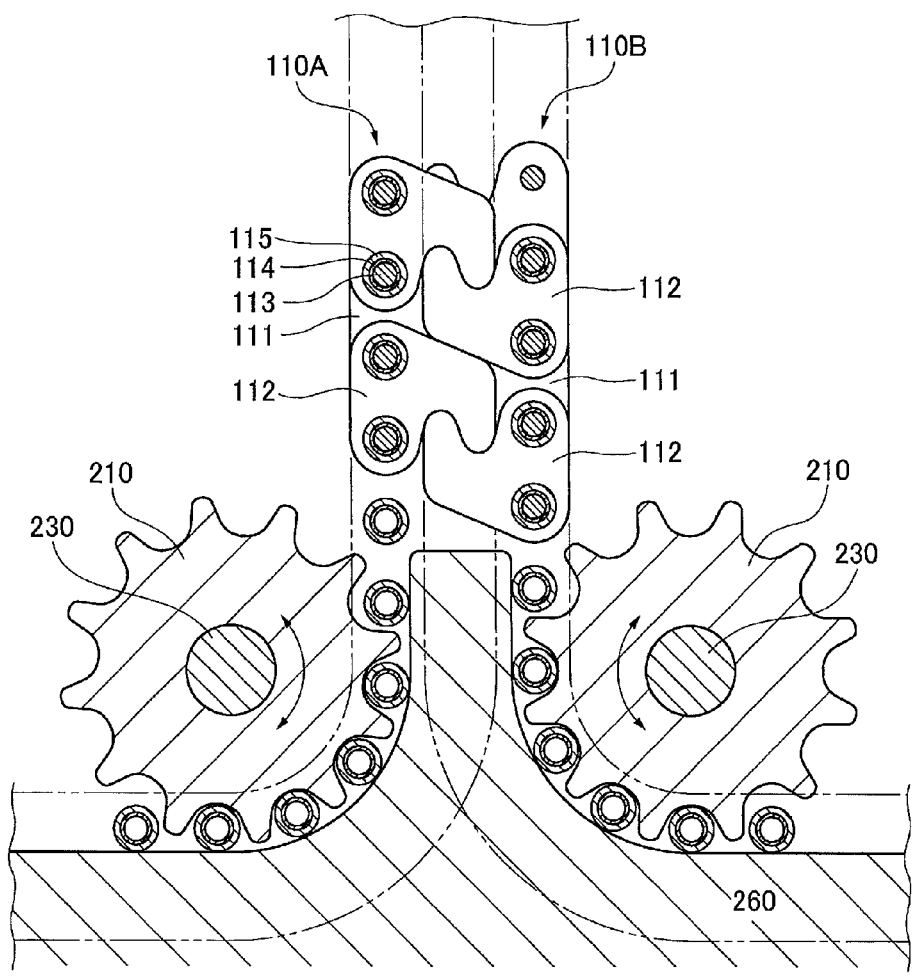
FIG. 5 is a diagram showing a state of contact between a chain guide plate and the interlocking chains.
Figure 6:
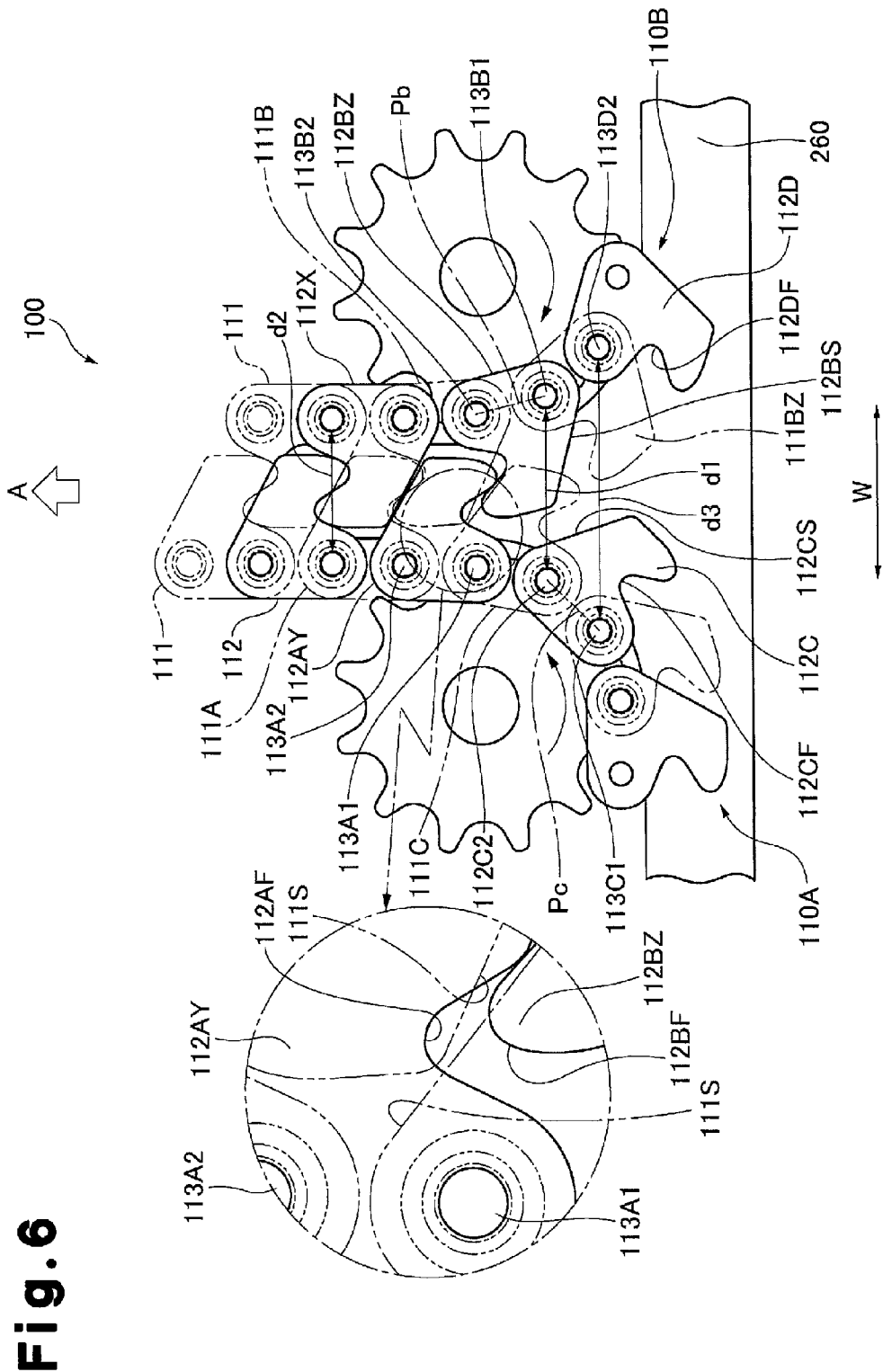
FIG. 6 is an explanatory view illustrating an interlocking operation process (A) in which a pair of interlocking chains are interlocked with each other.
Figure 7:
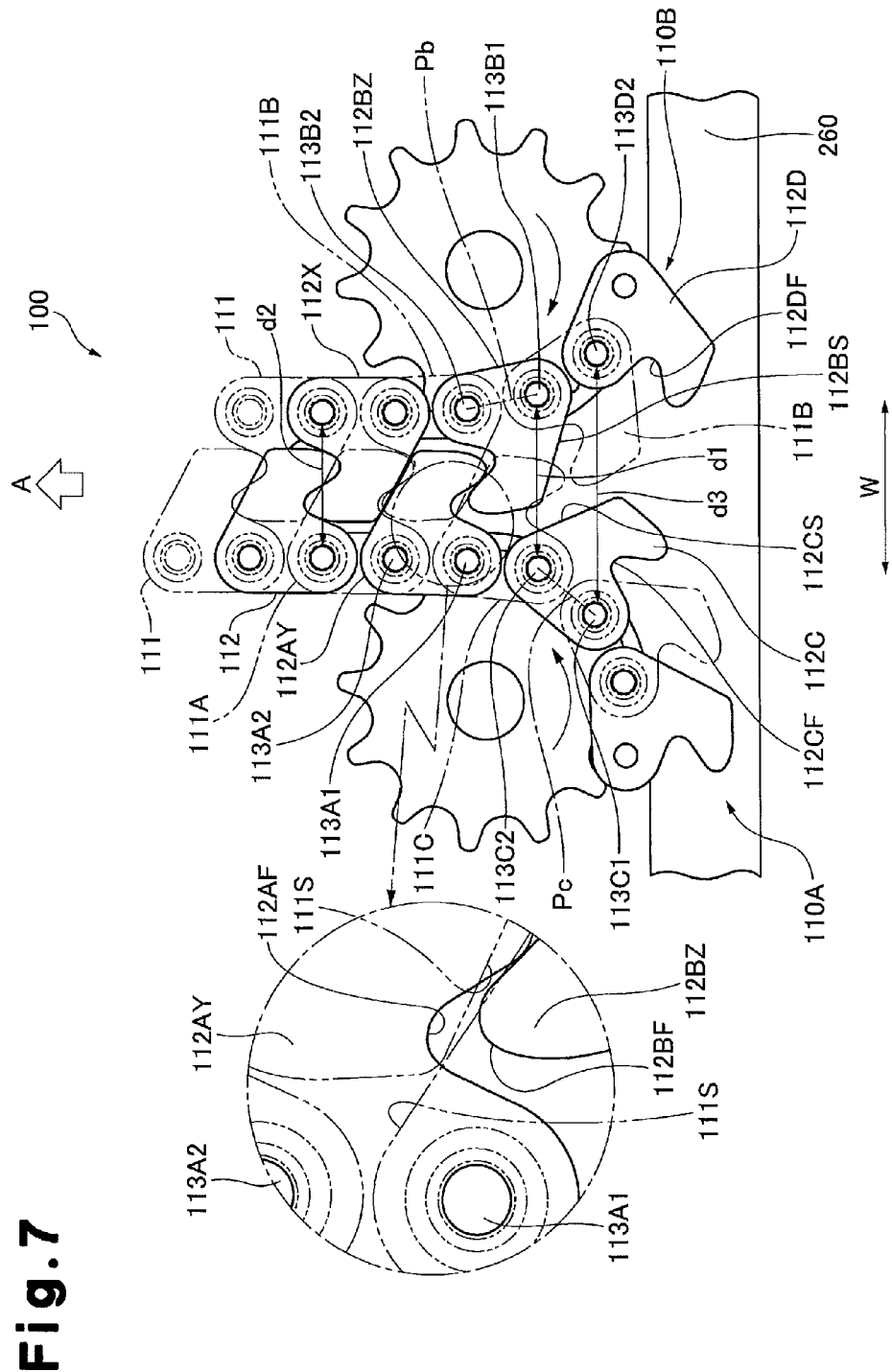
FIG. 7 is an explanatory view illustrating an interlocking operation process (B) in which the pair of interlocking chains are interlocked with each other.
Figure 8:
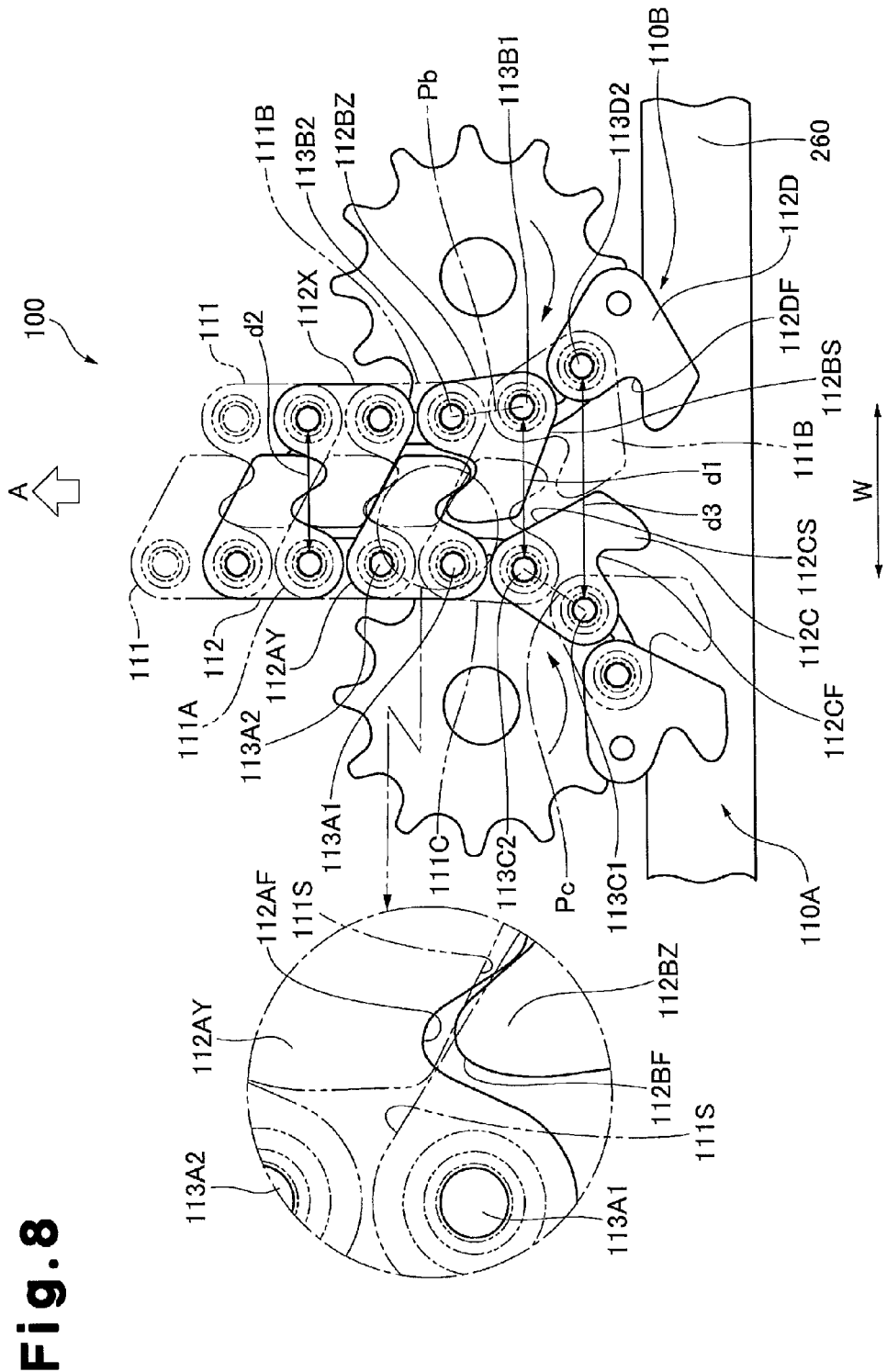
FIG. 8 is an explanatory view illustrating an interlocking operation process (C) in which the pair of interlocking chains are interlocked with each other.
Figure 9:
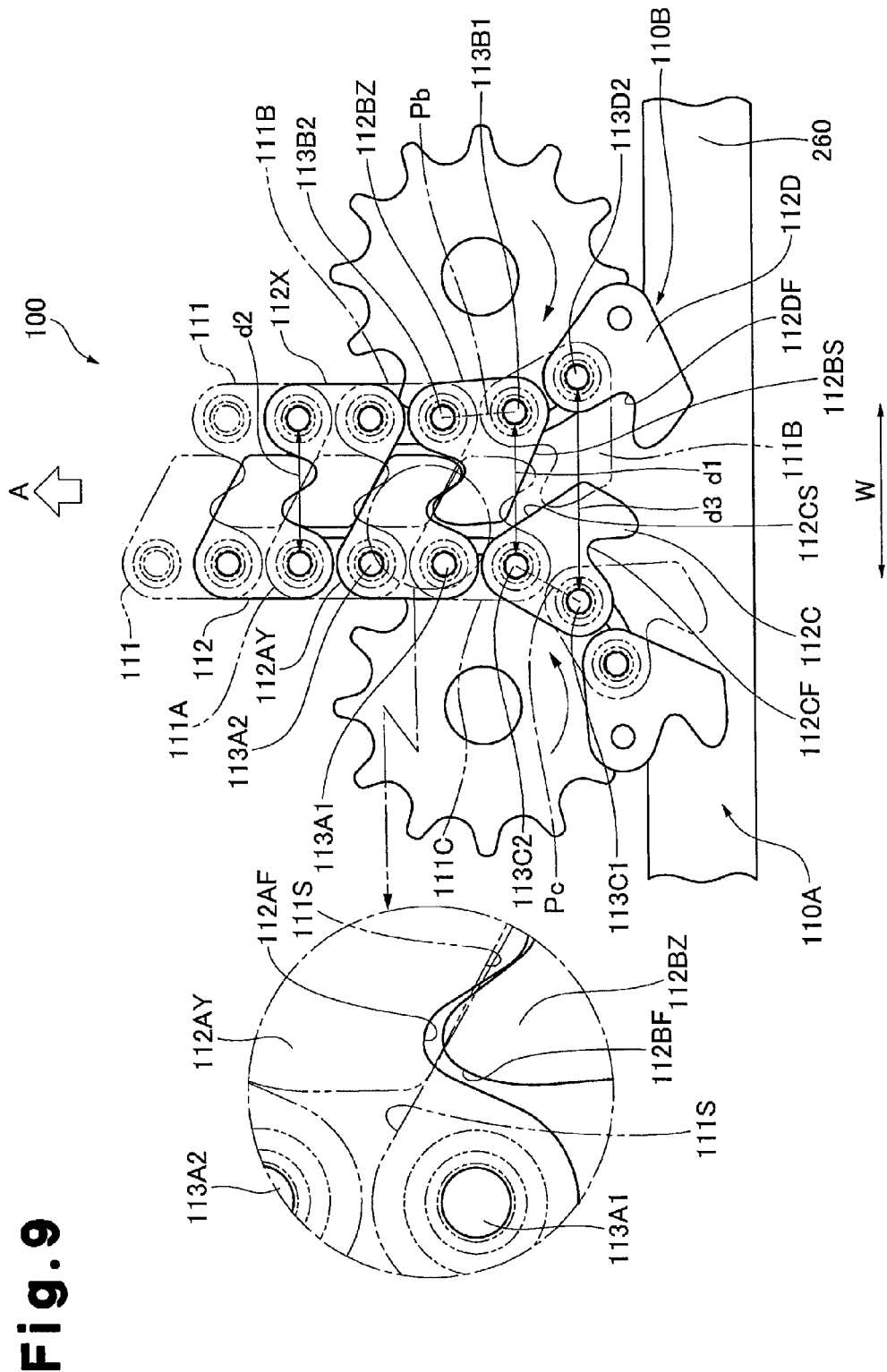
FIG. 9 is an explanatory view illustrating an interlocking operation process (D) in which the pair of interlocking chains are interlocked with each other.
Figure 10:
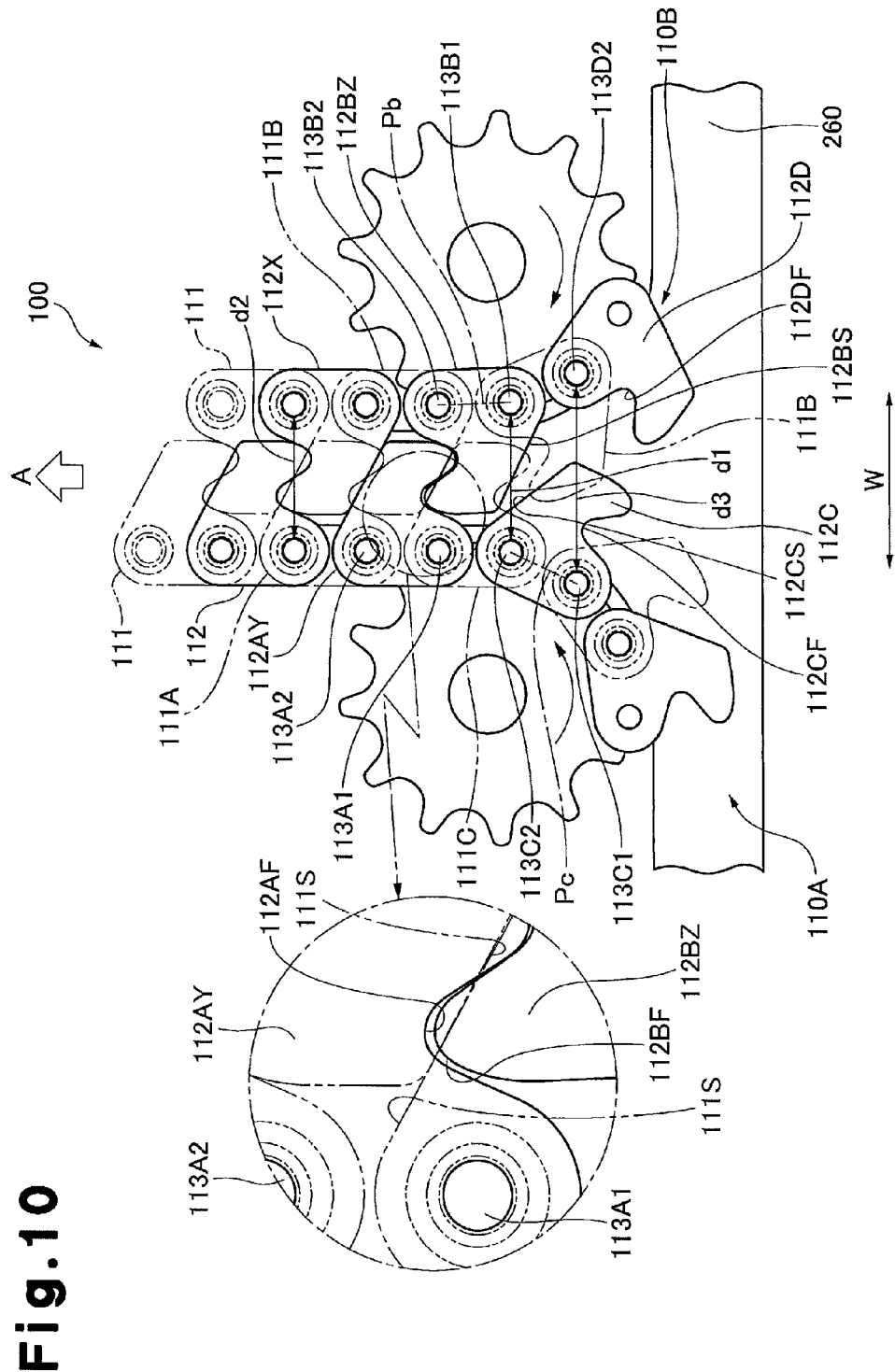
FIG. 10 is an explanatory view illustrating an interlocking operation process (E) in which the pair of interlocking chains are interlocked with each other.
Figure 11:
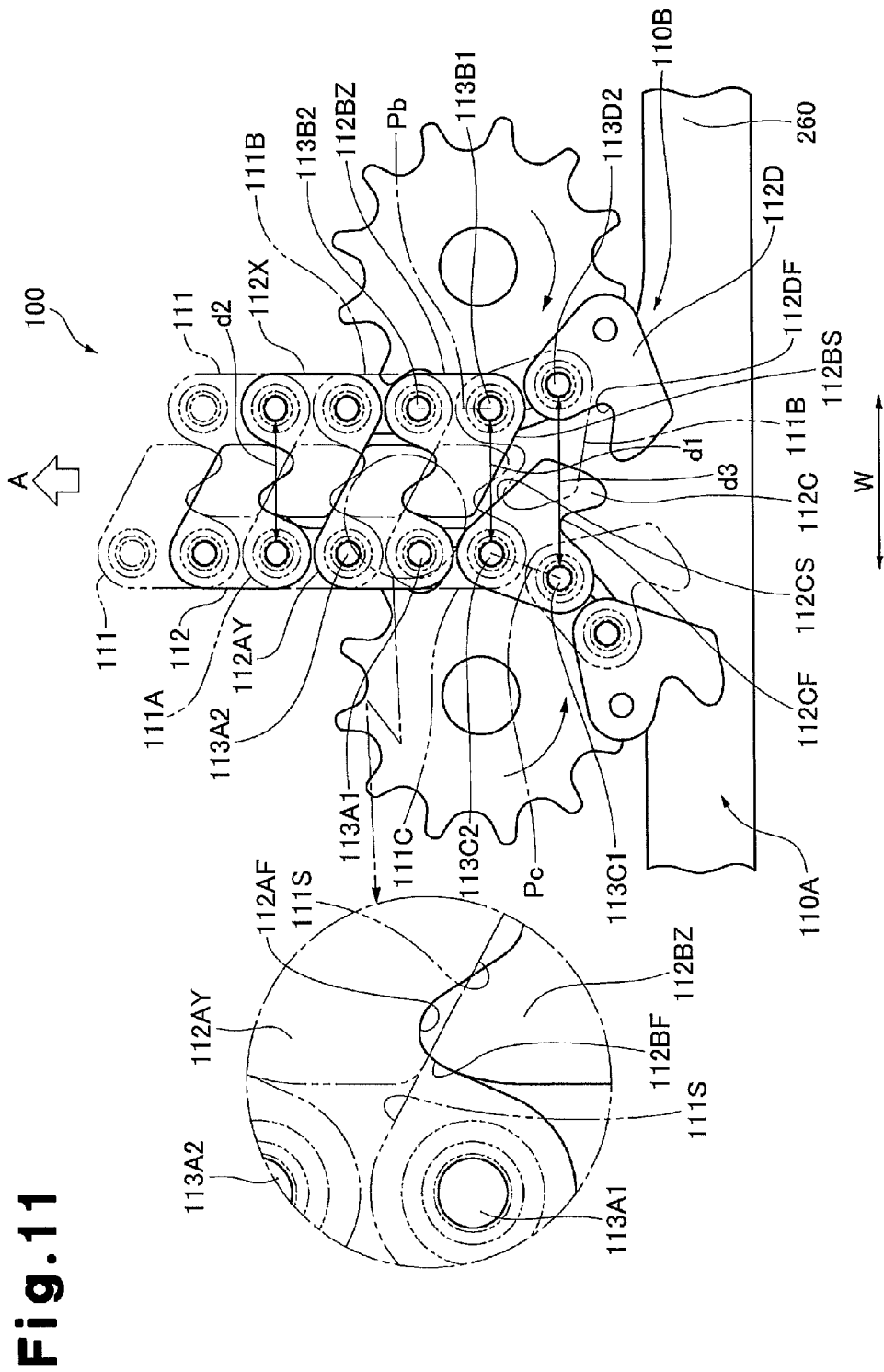
FIG. 11 is an explanatory view illustrating an interlocking operation process (F) in which the pair of interlocking chains are interlocked with each other.
Figure 12:
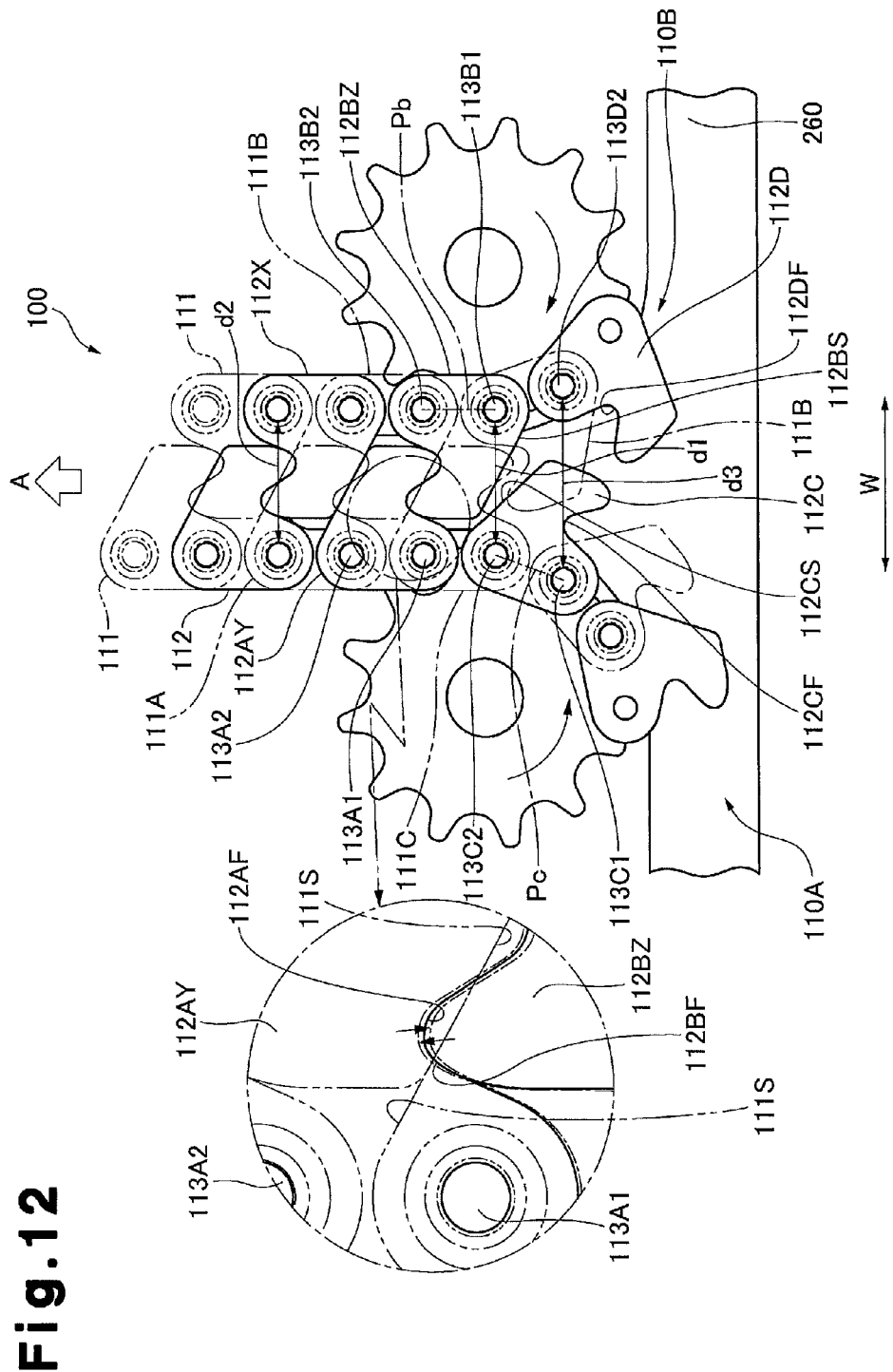
FIG. 12 is an explanatory view illustrating an interlocking operation process (G) in which the pair of interlocking chains are interlocked with each other.
Figure 13:
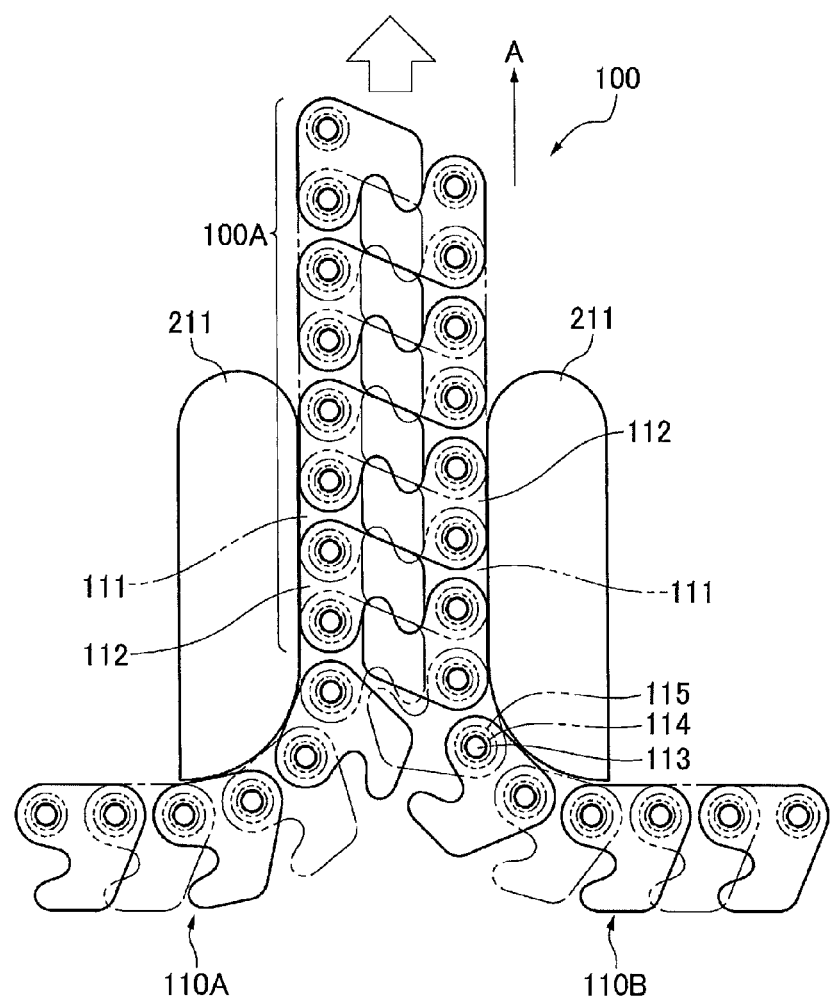
FIG. 13 is a front view illustrating another example of an interlocking operation of the pair of interlocking chains.

FIG. 1 is a perspective view illustrating an exploded and assembled state of the interlocking chain unit 100 according to an embodiment of the invention. FIG. 2 is a perspective view of an interlocking chain type forward and backward actuating device that includes the interlocking chain unit of the invention. FIG. 3 is a perspective view illustrating a state in which a lifting table is removed from FIG. 2. FIG. 4 is a partially enlarged view of the vicinity of a drive sprocket illustrated in FIG. 3. FIG. 5 is a diagram illustrating a contact state of a chain guide plate and the interlocking chains. FIGS. 6 to 12 are explanatory views sequentially illustrating an interlocking operation process in which the pair of interlocking chains is interlocked with each other. FIG. 13 is a front view illustrating another example of the interlocking operation of a pair of the interlocking chains.

In addition, hereinafter, the outer tooth link plates as each of the first to fourth link plates of the invention will be described as an example.

That is, hereinafter, for illustrative purposes, as the first to fourth link plates, and the outer tooth link plates will be described as an example. The structure of the interlocking chain unit 100 will be described by mainly focusing on the outer tooth link plates. Even when the inner tooth link plates are described as the first to fourth link plates as an example, the same advantages as a case of describing the outer tooth link plate as an example are obtained.

First, a basic structure of the interlocking chain unit 100 according to the present embodiment will be described while referring to FIG. 1.

As illustrated in FIG. 1, the interlocking chain unit 100 according to the present embodiment is what is called a zip chain, which is constituted by a pair of interlocking chains 110A and 110B, or a first interlocking chain 110A and a second interlocking chain 110B. The first interlocking chain 110A and the second interlocking chains 110B include outer tooth link plates 112 each having a hook-shaped interlocking end face 112F and a buckling restricting end face 112S, pairs of front and rear coupling pins 113, each pair being fitted to an outer tooth link plate 112, and inner tooth link plates 111 alternately arranged with the outer tooth link plates 112 in a state of being loosely fitted to the coupling pins 113, respectively. The first interlocking chain 110A and the second interlocking chain 110B are interlocked with each other to form a rigidified chain portion 100A, and are disengaged from each other to bifurcate, thereby switching the rigid state of the chain and the bifurcated state of the chain according to the advancing and retreating operation of the pair of interlocking chains 110A and 110B.

Rollers 115 are fitted over bushings 114, which are fitted in the inner tooth plates 111, into which the coupling pins 113 are loosely fitted, and which are respectively arranged between a pair of inner tooth plates 111, 111 facing each other in a chain thickness direction T.

Next, the structure of the interlocking chain unit 100 of the present embodiment described above will be described in detail with reference to FIGS. 1 to 12.

For example, the interlocking chain unit 100 of the present embodiment is driven in a freely advancing and retreating manner in the state of being provided in an interlocking chain type forward and backward actuating device 200.

The interlocking chain type forward and backward actuating device 200 having the above-described interlocking chain units 100 lifts and lowers a lifting table 240, on which a heavy object (not shown) is placed, in parallel with an installation floor face G as shown in FIG. 2.

As shown in FIGS. 1 to 5, the interlocking chain type forward and backward actuating device 200 includes the following as basic device structures: a base plate 220 mounted on the installation floor face G, with which the above-described lifting table 240 lifts and lowers in parallel; a pair of drive sprockets 210 facing each other and rotating in opposite directions, i.e., normal and reverse directions in the same plane and about a pair of rotating shafts 230 arranged parallel with the base plate 220; a pair of interlocking chain units 100, 100 each formed by paired pair of interlocking chains 110A, 110B configured to lift and lower the lifting table 240 by becoming disengaged from the pair of drive sprockets 210, 210; the above-described lifting table 240 mounted to upper ends of the interlocking chain units 100, 100 and integrally lifting and lowering; power transmitting chains 252 for transmitting power to a speed changing gear set 253 for rotating the pair of drive sprockets 210, 210; a drive motor 250 for driving the power transmitting chains 252; and chain guide plates 260 provided in bifurcation regions between the pair of drive sprockets 210 to guide and move the interlocking chain units 100.

In addition, in the present embodiment, a drive sprocket 210 constitutes an example of a "chain movement restricting means" of the invention.

Chain housing means 270 are located in a region around the maximum lowering position of the lifting table 240, i.e., outside and away from a projected platform of the lifting table 240 similarly to the drive motor 250.

In other words, one of the pair of interlocking chains 110A, 110B disengaged from each other is housed into the chain housing means 270 formed by a chain housing box 271 of a chain reeling type arranged on a side of the drive motor 250 and the other of the pair of interlocking chains 110A, 110B is housed into the chain housing means 270 formed by a straight housing rail 272 arranged on an opposite side facing the drive motor 250.

Next, the operation of the interlocking chain type forward and backward actuating device 200 including the interlocking chain unit 100 according to the present embodiment will be described with reference to FIGS. 1 to 5.

As shown in FIGS. 1 to 5, when the lifting table 240 reaches a maximum lifting position, the pair of interlocking chains 110A, 110B are respectively unreeled from the chain housing means 270 formed by the chain housing box 271 and the straight housing rail 272 by the pair of drive sprockets 210, 210 interlocked with the rollers 115, and the pair of interlocking chains 110A, 110B are lifted at equal speeds and swiftly by the two power transmitting chains 252 looped over output gears 251 according to output of the drive motor 250 while supporting total weight of the lifting table 240 on which a lifted and lowered object (not shown), which is a heavy object, is placed.

On the other hand, when the lifting table 240 reaches the maximum lowering position, the pair of interlocking chains 110A, 110B are disengaged from each other and respectively retracted into the chain housing means 270 formed by the chain housing box 271 and the straight housing rail 272 by the pair of drive sprockets 210, 210, and the pair of interlocking chains 110A, 110B are lowered at equal speeds and swiftly by the two power transmitting chains 252 looped over the output gears 251 according to the output of the drive motor 250 while supporting the total weight of the lifting table 240, on which the heavy object (not shown) is placed.

Particularly, in the interlocking chain type forward and backward actuating device 200, the drive sprockets 240, move the lifting table 240, i.e., the driven body forward and backward according to the chain forward and backward movements based on the interlocking and disengagement of the pair of interlocking chains 110A, 110B. As a result, the rigidified chain portions 100A having the increased rigidity drives the lifting table 240 forward and backward. Therefore, the interlocking chain units 100 can accurately move the lifting table 240 forward and backward to the predetermined positions while avoiding buckling, breaking, and bending of the rigidified chain portions 100A.

Next, a concrete form of the most characteristic structure of the interlocking chain unit 100 according to the present embodiment will be described in detail while referring to FIGS. 6 to 12.

As illustrated in FIGS. 6 to 12, in the interlocking chain unit 100 according to the present embodiment, the inner tooth link plates 111 and the outer tooth link plates 112 include a first link plate, or an outer tooth link plate 112AY, which is located at a position immediately before completing the interlocking operation and constitutes the interlocking chain 110A, and a second link plate, or an outer tooth link plate 112BZ, which constitutes the interlocking chain 110B and is subsequent to the outer tooth link plate 112AY. The interlocking operation between the outer tooth link plate 112AY and the outer tooth link plate 112BZ is completed such that a first inter-pin distance d1 between a disengagement-side coupling pin 113B1 of the outer tooth link plate 112BZ and the coupling pin 112C2 facing the disengagement-side coupling pin 113B1 of the outer tooth link plate 112BZ is made substantially equal to a second inter-pin distance d2 in the rigidified chain portion 100A, and a third inter-pin distance d3 between a third link plate having a coupling pin 112C2 facing the disengagement-side coupling pin 113B1 of the outer tooth link plate 112BZ and subsequent to the outer tooth link plate 112BZ, that is, a disengagement-side coupling pin 113C1 of the outer tooth link plate 112C, and a coupling pin 113D2 facing the disengagement-side coupling pin 113C1 of the outer tooth link plate 112C is made to approach the second inter-pin distance d2 in the rigidified chain portion 100A.

Thus, the transition to the smooth interlocking operation of other types of link plates subsequent to the outer tooth link plate 112BZ, that is, an inner tooth link plate 111BZ is achieved, in the state of fixing each of the positions of the disengagement-side coupling pin 113B1 of the outer tooth link plate 112BZ and a non-disengagement-side coupling pin 113B2 forming a pair there with, a plate axis Pb of the outer tooth link plate 112BZ, that is, the axial line connecting the disengagement-side coupling pin 113B1 and the non-disengagement-side coupling pin 113B2 of the outer tooth link plate 112BZ is matched in the forward and backward direction A of the rigidified chain, and an interlocking portion obtained by interlocking hook-shaped interlocking end faces 112AF and 112BF of each of the outer tooth link plate 112AY and the outer tooth link plate 112BZ is held by a buckling restricting end face 112CS of the outer tooth link plate 112C. Accordingly, the interlocking chain unit 100 is capable of achieving the rigid and reliable interlocking of the inner tooth link plates 111 and the outer tooth link plates 112 in the state of avoiding the action of the non-uniform compressive force at the time of the interlocking. The interlocking chain unit 100 is capable of avoiding buckling, breaking and bending of the rigidified chain portion 100A by improving the rigidity of the pair of interlocking chains 110A and 110B that are interlocked and integrated with each other.

In addition, in order that the interlocking between the first link plate, that is, the outer tooth link plate 112AY, and the second link plate, that is, the outer tooth link plate 112BZ between the first pins is completed, the hook-shaped interlocking end face 112AF of the outer tooth link plate 112AY and the hook-shaped interlocking end face 112BF of the outer tooth link plate 112BZ need to be fixed by the third link plate, subsequent to the outer tooth link plate 112BZ, that is, the outer tooth link plate 112C so as not to be disengaged from each other. Accordingly, each of the link plates behaves such that the third inter-pin distance d3 approaches the second inter-pin distance d2, thus the operation of the outer tooth link plate 112BZ being fixed by the outer tooth link plate 112C is completed, and the interlocking between the outer tooth link plate 112AY and the outer tooth link plate 112BZ between the first pins is completed.

More specifically, the inner tooth link plate 111B and the outer tooth link plate 112AY are interlocked with each other, while the inner tooth link plate 111A and an outer tooth link plate 112X are not displaced. Accordingly, in this stage, that is, in a state in which the inner tooth link plate 111A and the outer tooth link plate 112X are pushed from the lower plate without displacement, respective members, that is, the inner tooth link plates 111A and 111B, the outer tooth link plates 112X and 112AY, the coupling pins 113A2, and the coupling pins facing these pins are elastically deformed.

Furthermore, the proximity state of the third inter-pin distance d3 is achieved by the interlocking between the hook-shaped interlocking end faces of the inner tooth link plate 111 or the outer tooth link plate 112.

The advantage of improving the rigidity at the time of the interlocking between the interlocking chains 110A and 110B without any problem as described above is remarkably obtained when a compressive load is applied to the forward and backward direction A of the rigidified chain.

Moreover, in the interlocking chain unit 100 according to the present embodiment, when the first inter-pin distance d1 and the third inter-pin distance d3 are equal to the second inter-pin distance d2 in the rigidified chain portion 100A in the process of reaching the position of the outer tooth link plate 112AY from the position of the outer tooth link plate 112C at the time of the interlocking operation, any or all of the inner tooth link plate 111, the outer tooth link plate 112, and the coupling pin 113 are elastically deformed.

Thus, the vibration is avoided by smoothly interlocking the hook-shaped interlocking end faces 112AF and 112BF at the time of the interlocking operation. The interlocking chains 110A are sequentially rotated around the preceding coupling pin 113 in the forward and backward direction A of the rigidified chain among the pair of front and rear coupling pins 113A1, 113A2, 113B1, 113B2, 113C1, and 113C2 of each of the outer tooth link plates 112AY, 112BZ, and 112C performing the sequential interlocking operation. Also, backlash is further reduced in the state of removing the play between the components by rigidifying the pair of interlocking chains 110A and 110B along with the elastic deformation. Accordingly, the interlocking chain unit 100 is capable of reducing the vibration that is one of the obstacles when firmly and reliably interlocking the inner tooth link plates 111 and the outer tooth link plates 112, is capable of effectively, firmly and reliably interlocking the inner tooth link plates 111, and the outer tooth link plates 112 by utilizing the elastic force generated by the inner tooth link plate 111, the outer tooth link plate 112, and the preceding coupling pin 113, and is also capable of further avoiding buckling, breaking and bending of the rigidified chain portion 100A by improving the rigidity of the pair of interlocking chains 110A and 110B that are interlocked and integrated with each other.

Moreover, in the interlocking chain unit 100 according to the present embodiment, a buckling restricting end face 112CS of the outer tooth link plate 112C contacts a buckling restricting end face 112BS of the outer tooth link plate 112BZ at the time of the above-described interlocking operation. Also, the outer tooth link plate 112BZ behaves so as to match a plate axis Pc of the outer tooth link plate 112C with the forward and backward direction A of the rigidified chain at the time of the above-described interlocking operation.

As a result, the buckling restricting end face 112CS of the outer tooth link plate 112C contacts the buckling restricting end face 112BS of the outer tooth link plate 112BZ, along with the interlocking operation between hook-shaped interlocking end faces 112CF and 112DF of each of the same kind of an outer tooth link plate 112D subsequent to the outer tooth link plate 112C, and the outer tooth link plate 112C. Accordingly, the interlocking chain unit 100 is capable of firmly and reliably interlocking the inner tooth link plates 111 and the outer tooth link plates 112, and is capable of further reliably avoiding buckling, breaking, and bending of the rigidified chain portion 100A by improving the rigidity of the pair of interlocking chains 110A and 110B that are interlocked and integrated with each other.

Moreover, in the interlocking chain unit 100 according to the present embodiment, the hook-shaped interlocking end face 112CF of the outer tooth link plate 112C is interlocked with the hook-shaped interlocking end face 112DF of the outer tooth link plate 112D subsequent to the outer tooth link plate 112C at the time of the above-described interlocking operation, and the outer tooth link plate 112D behaves so as to match the plate axis Pc of the outer tooth link plate 112C with the forward and backward direction A of the rigidified chain at the time of the above-described interlocking operation.

As a result, the outer tooth link plate 112C is held by the outer tooth link plate 112D in the forward and backward direction A of the rigidified chain. Accordingly, the interlocking chain unit 100 is capable of avoiding buckling, breaking and bending of the rigidified chain portion 100A by reliably interlocking the pair of interlocking chains 110 and 110 in a state of guiding the outer tooth link plate 112 and the inner tooth link plate 111 in the forward and backward direction A of the rigidified chain.

In more detail, in the interlocking accompanied by the elastic deformation, even if the outer tooth link plate 112AY and the outer tooth link plate 112BZ are interlocked with each other, by the elastic force by which the elastically deformed component would return to the original status, the interlocked interlocking chains 110A and 110B are operated so as to be disengaged from each other.

At this time, it is difficult to maintain the interlocking accompanied by the elastic deformation only by the outer tooth link plate 112C, but by sequentially interlocking the link plates using the rigidified-side coupling pin 113 as a fulcrum, it is possible to suppress the disengagement of the chains with less power by the principle of leverage. Accordingly, the interlocking accompanied by the elastic deformation in the outer tooth link plates 112AY and 112BZ is completed by completion of the interlocking due to the outer tooth link plates 112C and 112D.

Moreover, in the interlocking chain unit 100 according to the present embodiment, the second inter-pin distance d2 is defined by the hook-shaped interlocking end faces 112AF and 112BF existing between the pair of coupling pins 113A1 and 113B2 facing each other in the chain width direction W in the state of being included in the rigidified chain portion 100A and interlocked with each other, and the buckling restricting end faces 111S and 111S contacting each other. This forms the rigidified chain portion 100A in a state of balancing the force acting on the hook-shaped interlocking end faces 112AF and 112BF interlocked with each other and the force acting on the buckling restricting end faces 111S and 111S contacting each other. Accordingly, it is possible to reliably avoid buckling, breaking, and bending of the rigidified chain portion 100A, by further improving the rigidity of the rigidified chain portion 100A in the state of defining the width of the rigidified chain portion 100A.

In addition, in regard to the hook-shaped interlocking end faces 112AF, 112BF, 112CF, and 112DF of the outer tooth link plate 112AY, 112BZ, 112C, and 112D, and the buckling restricting end faces 112AS, 112BS, 112CS, and 112DS of the outer tooth link plates 112AY, 112BZ, 112C, and 112D, the same advantages as obtained by the balance of forces described above are achieved with the progress of the interlocking operation.

In addition, the third inter-pin distance d3 is adapted to act in the direction of spreading between the coupling pins 113 by the contact of the buckling restricting end faces 112CS interposed between the disengagement-side coupling pin 113C1 of the third link plate, that is, the outer tooth link plate 112C, and the coupling pin 113D2 facing the disengagement-side coupling pin 113C1 of the outer tooth link plate 112C.

Furthermore, the inter-pin distance is adapted to act so as not to be spread by the contact of the hook-shaped interlocking end faces 112DF interposed between the disengagement-side coupling pin 113C1 of the outer tooth link plate 112C and the coupling pin 113D2 facing the disengagement-side coupling pin 113C1 of the outer tooth link plate 112C so as to be interlocked with each other.

By the interlocking so as to define the inter-pin distance in the direction in which the buckling restricting end face 112CS and the hook-shaped interlocking end face 112CF are opposite to each other in the width direction connected by the coupling pins 113, it is possible to define the inter-pin distance d3 at the time of the interlocking of the interlocking chains 110A and 110B, and achieve the rigidity.

In the case of the interlocking accompanied by the elastic deformation, since the inter-pin distance defined by the buckling restricting end face 112CS is greater than the inter-pin distance defined by the hook-shaped interlocking end face 112CF, it is possible to reliably restrict the inter-pin distance, and remarkably improve the rigidity of the chain.

In the interlocking chain unit 100 of the present embodiment obtained in this manner, the inner tooth link plates 111 and the outer tooth link plates 112 include a first link plate, or an outer tooth link plate 112AY, which is located at a position immediately before completing the interlocking operation and constitutes the interlocking chain 110A, and a second link plate, or an outer tooth link plate 112BZ, which constitutes the interlocking chain 110B and is subsequent to the outer tooth link plate 112AY. The interlocking operation between the outer tooth link plate 112AY and the outer tooth link plate 112BZ is completed such that the first inter-pin distance d1 between the disengagement-side coupling pin 113B1 of the outer tooth link plate 112BZ and the coupling pin 112C2 facing the disengagement-side coupling pin 113B1 of the outer tooth link plate 112BZ is made substantially equal to the second inter-pin distance d2 in the rigidified chain portion 100A, and the third inter-pin distance d3 between the third link plate having the coupling pin 112C2 facing the disengagement-side coupling pin 113B1 of the outer tooth link plate 112BZ and subsequent to the outer tooth link plate 112BZ, that is, the disengagement-side coupling pin 113C1 of the outer tooth link plate 112C, and the coupling pin 113D2 facing the disengagement-side coupling pin 113C1 of the outer tooth link plate 112C is made to approach the second inter-pin distance d2 in the rigidified chain portion 100A. Accordingly, it is possible to achieve the rigid and reliable interlocking of the inner tooth link plates 111 and the outer tooth link plates 112 in the state of avoiding the action of the non-uniform compressive force at the time of the interlocking, it is possible to avoid buckling, breaking and bending of the rigidified chain portion 100A by improving the rigidity of the pair of interlocking chains 110A and 110B that are interlocked and integrated with each other, and thus the advantages thereof are significant.

Next, another example of performing the interlocking operation of the interlocking chain unit 100 described above in the state of not being installed in the interlocking chain type forward and backward actuating device 200 will be described with reference to FIG. 13.

In addition, hereinafter, since the interlocking chain unit 100 is different from the interlocking chain unit 100 described above in that the interlocking chain unit 100 of the present example is driven in a state of not being installed in the interlocking chain type forward and backward actuating device 200, and the interlocking operation thereof is restricted by a chain movement regulating member 211 in place of the drive sprocket 210, the common parts are denoted by the common reference numerals, and the detailed description thereof will be omitted.

As illustrated in FIG. 13, in the interlocking chain unit 100, the pair of interlocking chains 110A and 110B are interlocked with each other by the chain movement regulating members 211 and 211 that restrict the deflection region of the operation of the pair of interlocking chains 110A and 110B in the forward and backward direction A of the rigidified chain from the chain disengagement direction.

Thus, since the driven body is driven forward and backward by the rigidified chain portion 100A with improved rigidity, the interlocking chain unit 100 is capable of achieving the accurate forward and backward movement of the driven body to a predetermined position, while avoiding buckling, breaking and bending of the rigidified chain portion 100A as in the case of being installed in the interlocking chain type forward and backward actuating device 200.

In addition, by guiding from the disengagement direction of the interlocking chains 110A and 110B to the interlocking position, the subsequent disengagement-side link plate holds the preceding rigidified-side plate. Accordingly, the rigidified chain portion 100A is adapted to move forward and backward while maintaining the rigidified state, without separation of the interlocked chains 110A and 110B.

In addition, as long as any member guides the interlocking chain unit 100 in the forward and backward direction A of the rigidified chain in the region between chain movement regulating members 211 and 211 by pressing the interlocking chain unit 100 from both sides, the chain movement regulating members 211 and 211 may be any member.

Even if the coupling pins 113 and 113 facing each other is slightly shifted in the forward and backward direction A of the rigidified chain at the time of the interlocking operation of the interlocking chains 110A and 110B, there is no problem in the interlocking operation of the interlocking chains 110A and 110B.

The advantage of allowing the interlocking between the interlocking chains 110A and 110B without any problem as described above is remarkably obtained when the compressive load is applied to the forward and backward direction A of the rigidified chain.

Description of the Reference Numerals
100 . . . interlocking chain unit
100A . . . rigidified chain portion
110A, 110B . . . interlocking chain
111 . . . inner tooth link plate
112F, 112AF, 112BF, 112CF, 112DF . . . hook-shaped interlocking end face
111S, 112S, 112BS, 112CS . . . buckling restricting end face
112, 112X, 112AY, 112BZ, 112C, 112D . . . outer tooth link plate
113, 113B1, 113B2, 113C1, 113C2, 113D2 . . . coupling pin
114 . . . bushing
115 . . . roller
200 . . . interlocking chain type forward and backward actuating device
210 . . . drive sprocket
211 . . . chain movement regulating member
220 . . . base plate
230 . . . axis of rotation of drive sprocket
240 . . . lifting table
250 . . . drive motor
251 . . . output gear
252 . . . power transmitting chain
253 . . . group of speed change gears
260 . . . chain guide plate
270 . . . chain housing means
271 . . . chain housing box
272 . . . straight housing rail
A . . . rigid chain forward and backward movement direction
d1 . . . first inter-pin distance
d2 . . . second inter-pin distance
d3 . . . third inter-pin distance
G . . . installation face
Pb, Pc . . . plate axis
T . . . chain thickness direction
W . . . chain width direction

The invention claimed is:

1. An interlocking chain unit comprising a pair of interlocking chains, wherein:
the pair of interlocking chains includes a first interlocking chain and a second interlocking chain, each of which includes outer tooth link plates each having a hook-shaped interlocking end face and a buckling restricting end face, pairs of front and rear coupling pins fitted to the outer tooth link plates, and inner tooth link plates alternately placed with the outer tooth link plates and interconnected to the coupling pins,
the first interlocking chain and the second interlocking chain are interlocked with each other to form a rigidified chain portion, and are disengaged from each other to bifurcate;
a link plate of the first interlocking chain that is one of the inner tooth link plates and the outer link plates of the first interlocking chain and is in a state immediately before completion of an interlocking operation when the first interlocking chain is rotated around the preceding coupling pin in the forward and backward direction of the rigidified chain portion is defined as a first link plate;
a link plate of the second interlocking chain that is located subsequent to the first link plate is defined as a second link plate, the second link plate having a disengagement-side coupling pin;
a link plate that is located subsequent to the second link plate is defined as a third link plate, the third link plate having a disengagement-side coupling pin and a coupling pin that faces the disengagement-side coupling pin of the second link plate; and
the interlocking operation between the first link plate and the second link plate is completed such that
a first inter-pin distance between the disengagement-side coupling pin of the second link plate and the coupling pin facing the disengagement-side coupling pin of the second link plate is made substantially equal to a second inter-pin distance in the rigidified chain portion;
a third inter-pin distance between the disengagement-side coupling pin of the third link plate and a coupling pin that faces the disengagement-side coupling pin of the third link plate is made to approach the second inter-pin distance in the rigidified chain portion; and wherein when the first inter-pin distance and the third inter-pin distance become equal to the second inter-pin distance in the rigidified chain portion in the process of reaching the position of the first link plate from the position of the third link plate at the time of the interlocking operation, any or all of the inner tooth link plates, the outer tooth link plates, and the coupling pins are elastically deformed in a state of balancing a force acting on the hook-shaped interlocking end faces interlocked with each other and a force acting on the buckling restricting end faces connecting each other.

2. The interlocking chain unit according to claim 1 wherein in the interlocking operation, the buckling restricting end face of the third link plate contacts the buckling restricting end face of the second link plate; and in the interlocking operation, the second link plate is provided co-planar with and in contact with the third link plate to form the rigidified chain.

3. The interlocking chain unit according to claim 1, wherein a link plate that is located subsequent to the third link plate is defined as a fourth link plate, in the interlocking operation, the hook-shaped interlocking end face of the third link plate is interlocked with the hook-shaped interlocking end face of the fourth link plate; and in the interlocking operation, the fourth link plate is provided co-planar with and in contact with the third link plate to form the rigidified chain.

4. The interlocking chain unit according to claim 1, wherein the second inter-pin distance is defined by the hook-shaped interlocking end faces existing between a pair of coupling pins that face each other in the chain width direction and are interlocked with each other in a state of being included in the rigidified chain portion, and by the buckling restricting end faces contacting each other.

5. The interlocking chain unit according to claim 1, wherein the pair of interlocking chains are interlocked with each other by a chain movement restricting means that regulates the operation of the pair of the interlocking chains from the chain disengagement direction to a deflection region that extends in the forward and backward direction of the rigidified chain.

6. The interlocking chain unit according to claim 5, wherein the chain movement restricting means is a drive sprocket provided in an actuating device configured to move a driven body forward and backward according to chain forward and backward movements based on interlocking and disengagement of the pair of interlocking chains.

* * * * *